(12) United States Patent
Macomber, III

(10) Patent No.: US 7,198,443 B2
(45) Date of Patent: Apr. 3, 2007

(54) MOTORCYCLE TRANSPORT SYSTEM AND METHOD THEREFOR

(76) Inventor: Chester E. Macomber, III, 441 Richgold St., Henderson, NV (US) 89102

( * ) Notice: Subject to any disclaimer, the term of this patent is extended or adjusted under 35 U.S.C. 154(b) by 0 days.

(21) Appl. No.: 11/050,209

(22) Filed: Feb. 3, 2005

(65) Prior Publication Data

US 2006/0171790 A1    Aug. 3, 2006

(51) Int. Cl.
*B60P 3/073*    (2006.01)
(52) U.S. Cl. .......................................... 410/7
(58) Field of Classification Search .................. 410/30, 410/3, 4, 7, 19, 21, 22, 23, 77, 101, 116; 211/20, 22
See application file for complete search history.

(56) References Cited

U.S. PATENT DOCUMENTS

| | | | | |
|---|---|---|---|---|
| 1,557,449 A * | 10/1925 | Fennell | .......................... | 410/22 |
| 1,604,215 A * | 10/1926 | Blakely | .......................... | 410/22 |
| 1,604,860 A * | 10/1926 | Van Der Meer | .............. | 410/22 |
| 1,605,579 A * | 11/1926 | Conn et al. | .................... | 410/13 |
| 1,697,790 A * | 1/1929 | Sousa | .......................... | 410/13 |
| 1,708,613 A * | 4/1929 | Girard | .......................... | 410/22 |
| 1,724,556 A * | 8/1929 | Blakely | .......................... | 410/22 |
| 1,794,321 A * | 2/1931 | Rebuck | ....................... | 410/22 |
| 1,812,807 A * | 6/1931 | Snyder | ......................... | 410/18 |
| 1,824,634 A * | 9/1931 | Snyder | ......................... | 410/18 |
| 1,838,975 A * | 12/1931 | Williams | ...................... | 410/22 |
| 1,906,022 A * | 4/1933 | Tobin | ........................... | 410/21 |
| 1,983,113 A * | 12/1934 | Williams | ...................... | 410/18 |
| 2,013,345 A * | 9/1935 | Gellatly | ....................... | 105/159 |
| 2,450,979 A | 10/1948 | Moller | | |
| 2,835,499 A | 5/1958 | Andren et al. | | |
| 3,753,579 A | 8/1973 | Kurilich, Jr. | | |
| 5,529,448 A | 6/1996 | Kosma | | |
| 5,816,757 A * | 10/1998 | Huston | .......................... | 410/3 |
| 6,171,034 B1 | 1/2001 | Burgoon et al. | | |
| 6,450,282 B1 | 9/2002 | Gogo et al. | | |
| 6,488,157 B2 | 12/2002 | Chen | | |
| 6,655,885 B2 * | 12/2003 | Trauthwein | .................. | 410/97 |
| 6,715,972 B2 * | 4/2004 | Jackson, Sr. | ................. | 410/97 |
| 6,802,493 B2 | 10/2004 | Lance | | |
| 6,932,550 B1 * | 8/2005 | Hope | ............................. | 410/3 |
| 2002/0117459 A1 | 8/2002 | Chen | | |
| 2003/0141493 A1 | 7/2003 | Silvonen | | |
| 2004/0195800 A1 | 10/2004 | Mullins | | |

* cited by examiner

*Primary Examiner*—H. Gutman
(74) *Attorney, Agent, or Firm*—Harry M. Weiss; Veronica-Adele Cao; Weiss & Moy P.C.

(57) ABSTRACT

A motorcycle transport system and method therefor includes a crossbar that is insertable through a hollow bore of a motorcycle such as a swing arm pivot so that the motorcycle is securable for transport by securing the crossbar. One or more stands may couple to the crossbar for securing the motorcycle. Base receiving members may be mounted to a transport surface such as a truck bed for enabling the stands to be removed when not in use.

17 Claims, 3 Drawing Sheets

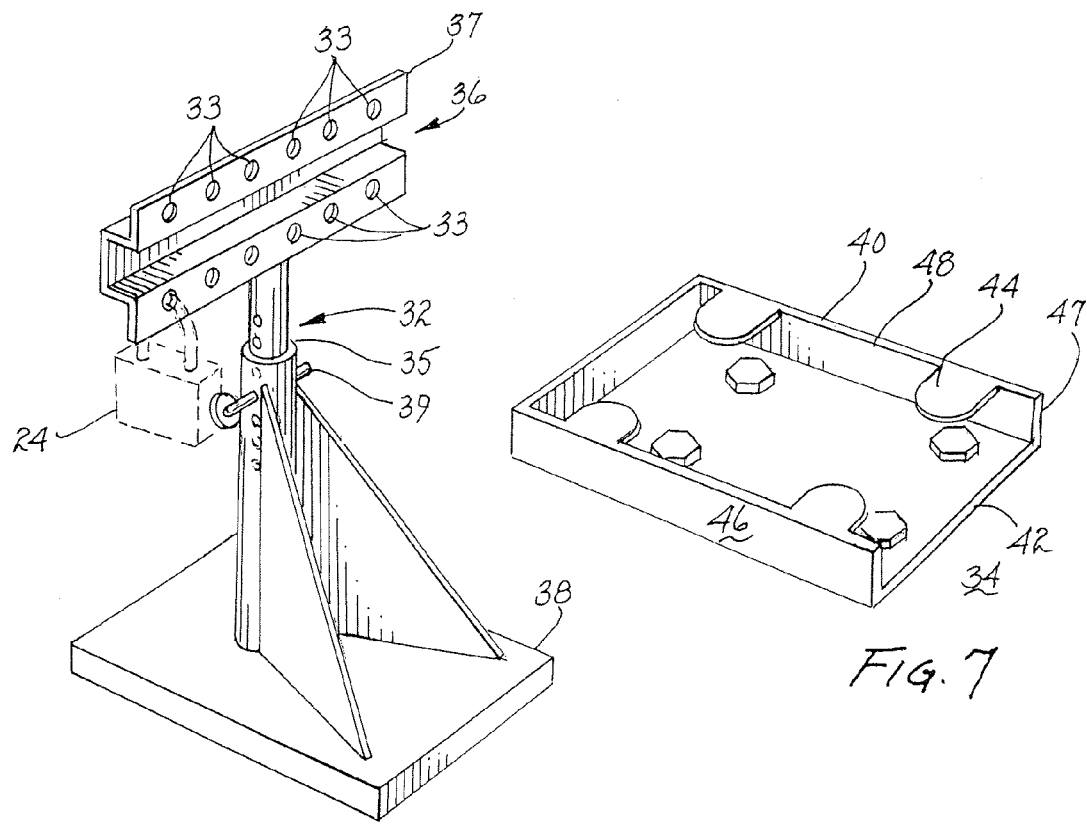
Fig. 6
Fig. 7
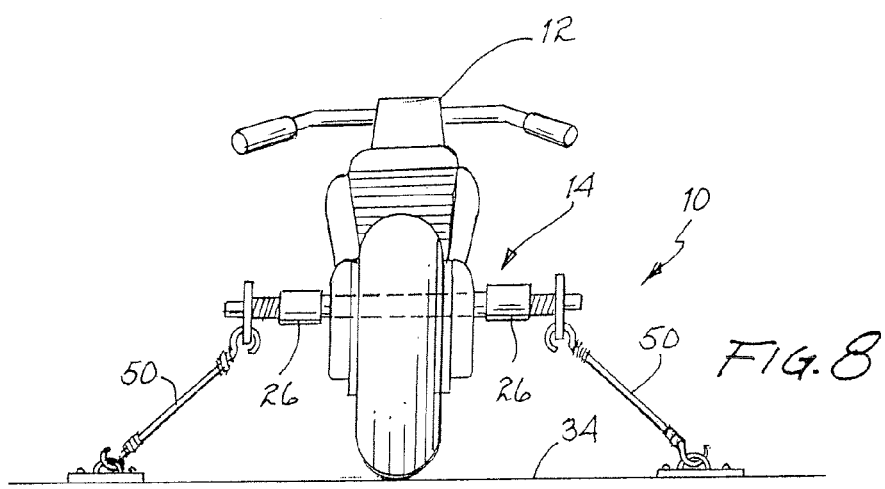
Fig. 8

MOTORCYCLE TRANSPORT SYSTEM AND METHOD THEREFOR

FIELD OF THE INVENTION

This invention relates generally to transporting motorcycles, and more particularly to systems and methods for securing motorcycles to transport surfaces.

DESCRIPTION OF THE RELATED ART

Transport of a motorcycle presents various difficulties due to the high center of gravity, weight, and lateral instability inherent in motorcycle designs. Frequently, motorcycles have a built-in stand to keep the motorcycle upright when not in use. Side stands rotate outward from the center of the motorcycle body to support the motorcycle when the motorcycle is leaned onto the stand. Center stands typically rotate downward and under the rear wheel to provide a wider support base for the motorcycle while the motorcycle remains upright.

Each type of stand suffers drawbacks when the motorcycle experiences lateral and vertical forces during transport. Although side stands provide some stability due to the widened support base for the motorcycle, these stands only provide support on a single side of the motorcycle, and require the motorcycle to be leaned to one side. The result is that the center of gravity of the motorcycle is shifted over the relatively narrow stand, which may collapse when a forward force is applied, or may simply not provide enough lateral support to prevent the motorcycle from falling when a sufficient lateral force is applied in the direction of the lean. Additionally, a lateral force applied in the opposite direction need only be sufficient to straighten the motorcycle from its lean for the motorcycle to fall to the other side.

Although center stands provide support on both sides of the motorcycle, they tend to be relatively narrow and thus not very stable in light of the forces that may be experienced during travel, such as from a sharp turn, a pothole, or an emergency stop. Finally, many motorcycles are not equipped with any stands at all.

As a result, additional support must be provided to secure a motorcycle for transport. Typically, a motorcycle is positioned on the bed of a truck or van or on a trailer and then secured to the transporting vehicle with ropes or chains. However, motorcycles typically do not provide useful anchoring points to attach a rope or chain at or above its center of gravity. For example, handlebars are strong and higher than the center of gravity, but are not stable because they pivot and are far forward of the center of gravity. The engine itself does not typically provide any useful anchoring points. The seat and rear fender tend to not be strong enough for securing the motorcycle, and are often lower than the center of gravity.

Additionally, owners tend to have particular requirements that hamper efforts to secure their motorcycles during transport. Some owners place great pride in the appearance of their motorcycles and would not accept solutions such as welding on hooks or rings to make securing easier. Owners of racing or off-road motorcycles are also reluctant to introduce components that may increase the weight or aerodynamic drag of their motorcycles. Most motorcycle owners will not accept a securing device that may scrape or dent their motorcycle. Finally, owners of trucks, vans and trailers tend to be reluctant to permanently mount one or more support stands for holding their motorcycles during transport, as these stands would decrease the utility of their vehicle for other uses.

A need therefore exists for a device and method for securing a motorcycle for transport that overcomes these problems.

It is an object of the present invention to provide a removable device that ebales securing a motorcycle without damaging the appearance of the motorcycle.

It is another object of the present invention to provide a device for securing a motorcycle in a minimal amount of space.

It is yet another object of the present invention to provide a device for securing a motorcycle to a vehicle without impairing the utility of the vehicle for other uses.

The present invention satisfies these needs, and provides other, related, advantages.

SUMMARY OF THE INVENTION

The foregoing objectives are achieved in the motorcycle transport system and method therefor.

In accordance with one embodiment of the present invention, a device for securing a motorcycle is disclosed. It includes a motorcycle defining a substantially horizontal bore extending between a first aperture defined by a first side of the motorcycle and a second aperture defined by a second side of the motorcycle. A crossbar having a first end and a second end has a length greater than a length of the substantially horizontal bore and is dimensioned to be inserted through the bore. A first cap is removably coupled to the first end of the crossbar and has a diameter greater than a diameter of the bore. A second cap is coupled to the second end of the crossbar, and has a diameter greater than a diameter of the bore. At least one crossbar attachment mechanism is dimensioned to be coupled to at least one of the first cap and the second cap in order to secure transport of the motorcycle while the crossbar is inserted therethrough.

In accordance with another embodiment of the present invention, a device for securing a motorcycle is disclosed. It includes a motorcycle defining a substantially horizontal hollow bore extending between a first aperture on a first side of the motorcycle and a second aperture on a second side of the motorcycle. A crossbar having a removable first end, a central portion, and a second end has a length greater than a length of the substantially horizontal bore and is dimensioned so that only the central portion is insertable through the bore. At least one of the first end and the second end of the crossbar define an aperture to secure transport of the motorcycle while the crossbar is inserted therethrough.

In accordance with yet another embodiment of the present invention, a method of motorcycle transport is disclosed. It includes providing a motorcycle defining a substantially horizontal bore extending between a first aperture on a first side of the motorcycle and a second aperture on a second side of the motorcycle, providing a transport surface for supporting the motorcycle, inserting a crossbar through the bore of the motorcycle, positioning the motorcycle in an upright position on the transport surface so that each wheel of the motorcycle contacts the transport surface; and securing at least one end of the crossbar to the transport surface.

The foregoing and other objects, features, and advantages of the invention will be apparent from the following, more particular, description of the preferred embodiment of the invention, as illustrated in the accompanying drawings.

BRIEF DESCRIPTION OF THE DRAWINGS

FIG. 6 is an illustration depicting a perspective view of a stand in accordance with an embodiment of the present invention.

FIG. 7 is an illustration depicting a perspective view of a base receiving member in accordance with an embodiment of the present invention.

FIG. 8 is an illustration depicting a rear elevational view of motorcycle transport device securing a motorcycle using cables in accordance with an embodiment of the present invention.

DESCRIPTION OF EMBODIMENTS OF THE INVENTION

Figure 1:
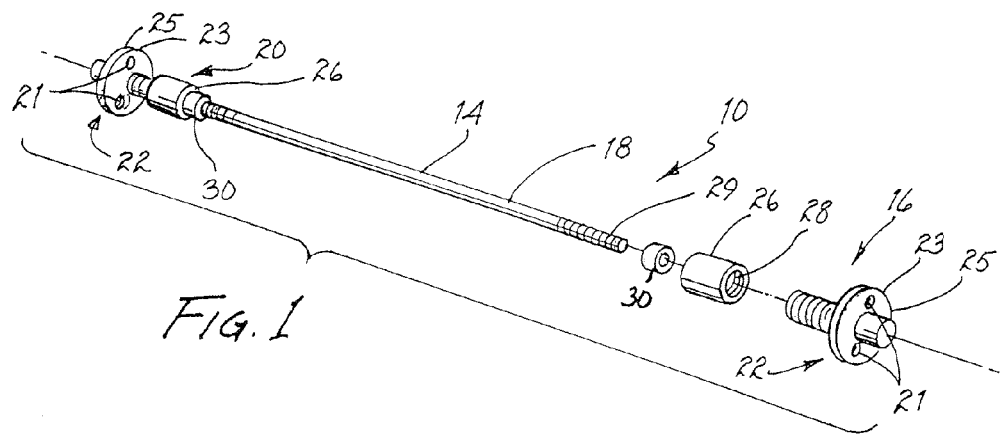
FIG. 1 is an illustration depicting a partially exploded perspective view of a motorcycle transport device in accordance with an embodiment of the present invention.

With reference now to the figures, and in particular to FIG. 1 a device 10 for securing a motorcycle 12 (see Fig. 2) is shown in accordance with a first embodiment of the present invention. Motorcycle 12 defines a substantially horizontal bore extending from one side to the other, such as a hollow swing arm pivot bolt (see FIG. 2) or rear axle (not shown). Device 10 has a crossbar 14 with a removable first end 16, a central portion 18, and a second end 20. Crossbar 14 has a length greater than the bore and is small enough to pass through the bore.

Figure 3:
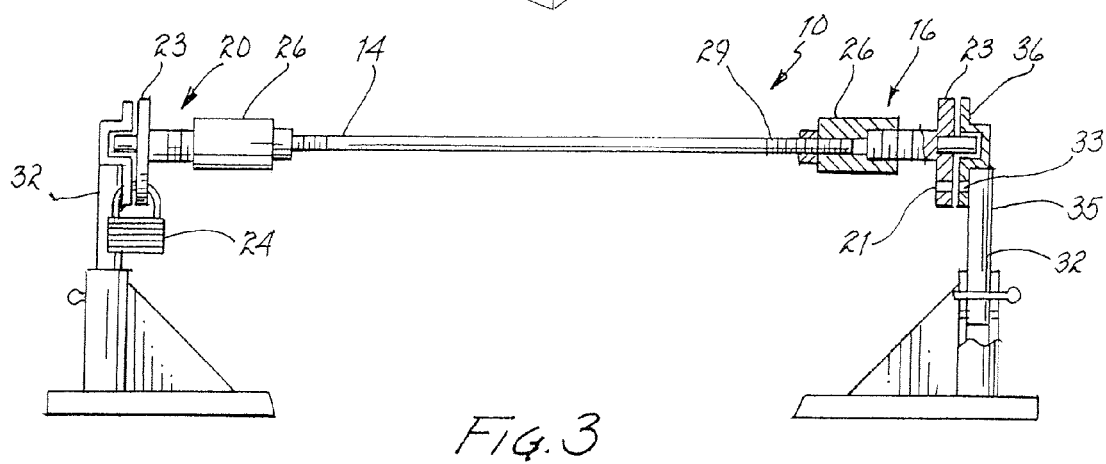
FIG. 3 is an illustration depicting a partially sectional front elevational view of a motorcycle transport device with two stands in accordance with an embodiment of the present invention.

In the embodiment depicted in FIG. 1, first end 16 and second end 20 have caps 25 with a diameter larger than the diameter of the bore of motorcycle 12. One or both caps 25 may be removable for securing device 10 to motorcycle 12 via insertion through the bore. A cross-sectional view of removable cap 25 is depicted in FIG. 3 as being threaded for attachment and removal. However, removable cap 25 need not be threaded, so long as removable cap 25 is securely attachable. For example, removable cap 25 may be attached with a spring biased pin engaging a corresponding hole, or with a threaded fastener such as a bolt, or the like. Crossbar 14 is installed by removing cap 25 from first end 16 and inserting central portion 18 through the bore to extend out the other side. Cap 25 is reattached to first end 16, securing crossbar 14 within the bore of motorcycle 12.

A crossbar attachment mechanism 22 is dimensioned to be coupled to one or more caps 25 and preferably includes at least one surface of cap 25 defining at least one aperture 21. In one embodiment, crossbar attachment mechanism 22 includes a disk-shaped member 23 defining one or more apertures 21 as depicted in FIG. 1. Apertures 21 are engagable by a mechanism such as a lock 24 as illustrated in FIG. 3, hooks as illustrated in FIG. 8, ropes or cables, or any other suitable device that may engage one or more apertures 21. Although preferably crossbar attachment mechanism 22 includes a disk-shaped member 23 defining one or more apertures 21, crossbar attachment mechanism 22 need not include a disk-shaped member 23 defining one or more apertures 21, and may include one or more hooks (not shown), eyelets (not shown), clamps (not shown), or other suitable fastening mechanism, or any combination thereof.

While, in this embodiment, first end 16 and second end 20 have caps 25 with a diameter larger than the diameter of the bore of motorcycle 12, it should be clearly understood that substantial benefits can be derived in another embodiment wherein first end 16 and second end 20 do not have caps 25. For example, crossbar 14 may instead have first end 16 and second end 20 having a dimension larger than a diameter of the bore, with at least one of first end 16 and second end 20 being removable. Crossbar 14 is then installed by removing first end 16 and inserting central portion 18 through the bore to extend out the other side. First end 16 is reattached to central portion 18, securing crossbar 14 within the bore of motorcycle 12. Crossbar attachment mechanism 22 may then be dimensioned to be coupled to at least one of first end 16 and second end 20 for securing crossbar 14, such as having a portion of at least one of first end 16 and second end 20 defining apertures 21.

Returning to the embodiment depicted in FIG. 1, device 10 has two collars 26 larger than the bore of motorcycle 12. Collars 26 are movably coupled to crossbar 14 so that the collars are positionable against the side of motorcycle 12. As depicted in FIG. 3, collars 26 are preferably cylindrical and define a threaded inner cylindrical bore 28 that mates with a threaded portion 29 of crossbar 14. Collars 26 are thus positionable along crossbar 14 by rotating collars 26. Collars 26 may be tightened against each side of motorcycle 12 to further secure crossbar 14 for motorcycles 12 having bores of various lengths. However, collars 26 need not define threaded bores 28, and may instead be positionable using other well-known mechanisms such as, for example: with a pin engaging one of several holes in crossbar 14, or by a locking clamp, or the like. Furthermore, although it is preferred that device 10 have at two collars 26, it should be clearly understood that certain benefits may be obtained by instead having a single collar 26, or no collars 26, so long as motorcycle 12 is securable by device 10.

In accordance with an embodiment as depicted in FIG. 1, device 10 includes protective washers 30 dimensioned to be placed between collar 26 and motorcycle 12 for preventing direct contact between collars 26 and the sides of motorcycle 12. Washers 30 may be of Teflon® non-stick coating, rubber, or any other material of sufficient pliability to prevent damage from contact of collars 26 with motorcycle 12, such as by preventing chipping or scraping. Washers 30 may also reduce or distribute force due to lateral movement, such as arising from transporting motorcycle 12 on a trailer over a rough road, and therefore reduce denting or structural damage.

Figure 2:
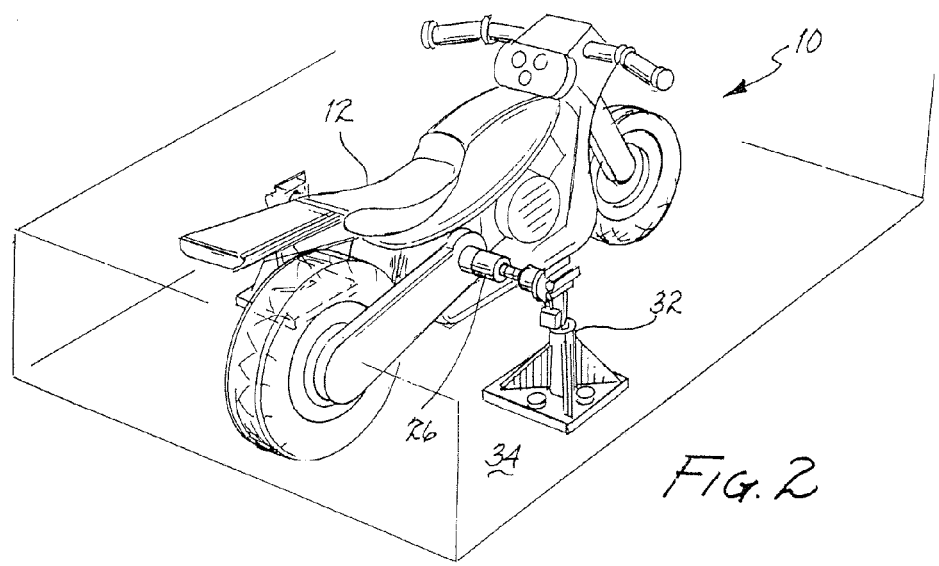
FIG. 2 is an illustration depicting a perspective view of a motorcycle transport device with a single stand supporting a motorcycle in accordance with an embodiment of the present invention.

FIG. 2 illustrates an embodiment of the present invention in which device 10 includes a single stand 32 for providing rigid support to crossbar 14 and connected motorcycle 12. In the embodiment depicted in FIG. 2, stand 32 is bolted to the surface 34 such as a truck or trailer bed supporting motorcycle 12. When stand 32 is rigidly attached to surface 34 and also rigidly attached to crossbar 14 via crossbar attachment mechanism 22 (here illustrated by a padlock 24 engaging an aperture 21), a single stand 32 may sufficiently restrain motion of motorcycle 12 during transport when surface 34 is moving.

In accordance with an embodiment of the present invention depicted in FIG. 6, stand 32 preferably has a vertical support element 35 and a stand attachment mechanism 36 for attaching to crossbar 14 via crossbar attachment mechanism 22. A base 38 is rigidly attached to vertical support element 35. Preferably, stand attachment mechanism 36 includes a substantially horizontal member 37 defining one or more apertures 33.

In accordance with an embodiment as depicted in FIG. 3, stand 32 is securable to crossbar 14 by extending lock 24 through aperture 33 defined by horizontal member 37 of stand 32 and further through aperture 21 defined by disk-shaped member 23 of crossbar 14. However, it should be clearly understood that it is within the spirit and scope of the present invention that stand attachment mechanism 36 may not include a substantially horizontal member 37 defining one or more apertures 33, and may instead include hooks, clamps, eyelets, or any other mechanism configured for secure attachment to crossbar attachment mechanism 22, or any combination thereof.

Although it is preferred that stand 32 have stand attachment mechanism 36, it should be clearly understood that certain benefits may be obtained by not having stand attachment mechanism 36, as long as stand 32 is securable attachable to crossbar 14. For example, crossbar attachment mechanism 22 may include a clamp allowing crossbar 14 to be clamped directly to vertical support element 35.

Because device 10 is attachable to motorcycle 12 via insertion through a hollow swing arm pivot, hollow rear axle, or the like, and further because each of these may be at different heights on different models of motorcycle 12, in some embodiments of the present invention a vertical position of stand attachment mechanism 36 is adjustable. As depicted in FIG. 6, a telescoping structure of vertical support element 35 enables a desired height to be set by insertion of a pin 39. However, it is within the spirit and scope of the present invention that vertical positioning instead may be accomplished by other mechanisms such as a pawl-and-ratchet, scissor-screw, hydraulic or compressed air cylinder, electric motor, or the like.

Turning now to FIG. 7, a base receiving member 40 is depicted in accordance with an embodiment of the present invention. Base receiving member 40 is dimensioned to rigidly engage at least a portion of base 38, so that stand 32 need not be directly mounted to surface 34. Because surface 34 may not be dedicated for use with motorcycle transport, and may instead be also used for other purposes, having stand 32 permanently mounted to surface 34 may be undesirable. Instead, base receiving member 40 may be directly mounted to surface 34, allowing stand 32 to be removed when not in use. Base receiving member 40 is preferably substantially flush with surface 34 and configured to allow easy removal of stand 32 to be easily removed, thus allowing substantially unimpaired use of surface 34 for purposes other than motorcycle transport.

In accordance with the embodiment depicted in FIG. 7, base receiving member 40 has a lower portion 42 for mounting to surface 34, an upper portion 44 for restricting an upward motion of base 38, and a wall 46 that vertically separates lower surface 42 from upper surface 44. Wall 46 restricts lateral motion of base 38. An opening 47 in wall 46 is dimensioned so that base 38 may be inserted into base receiving member 40, and upper portion 44 defines a channel 48 dimensioned to accommodate vertical support element 35 of stand 32, so that stand 32 is insertable by sliding into opening 47 and is held in place by upper portion 44 and wall 46. Although depicted in FIG. 7 as being substantially rectangular, it is within the spirit and scope of the present invention that base receiving member 40 not be rectangular, as long as stand 32 is securely held when attached.

Figure 5:
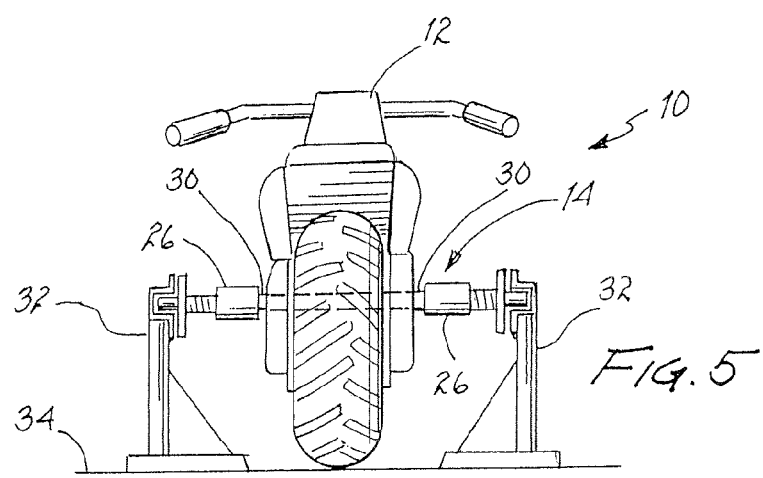
FIG. 5 is an illustration depicting a rear elevational view of a motorcycle transport device with two stands supporting a motorcycle in accordance with an embodiment of the present invention.

In accordance with the embodiments depicted in FIGS. 3 and 5, two stands 32 may be used instead of a single stand 32. Using two stands 32 distributes forces experienced during transport of motorcycle 12 that would otherwise be borne by a single stand 32. Stand attachment mechanism 36 may further define a channel to accommodate each end of crossbar 14 for providing additional support. When base receiving members 40 are used, preferably base receiving members 40 are positioned at an appropriate distance so that each stand 32 is attachable to crossbar 14 when supporting motorcycle 12. It is preferred that base receiving members 40 are oriented so that wall openings 47 either both face inward or both face outward from motorcycle 12 so that at least one wall 46 restricts motion of motorcycle 12 in each lateral direction during transport.

Figure 4:
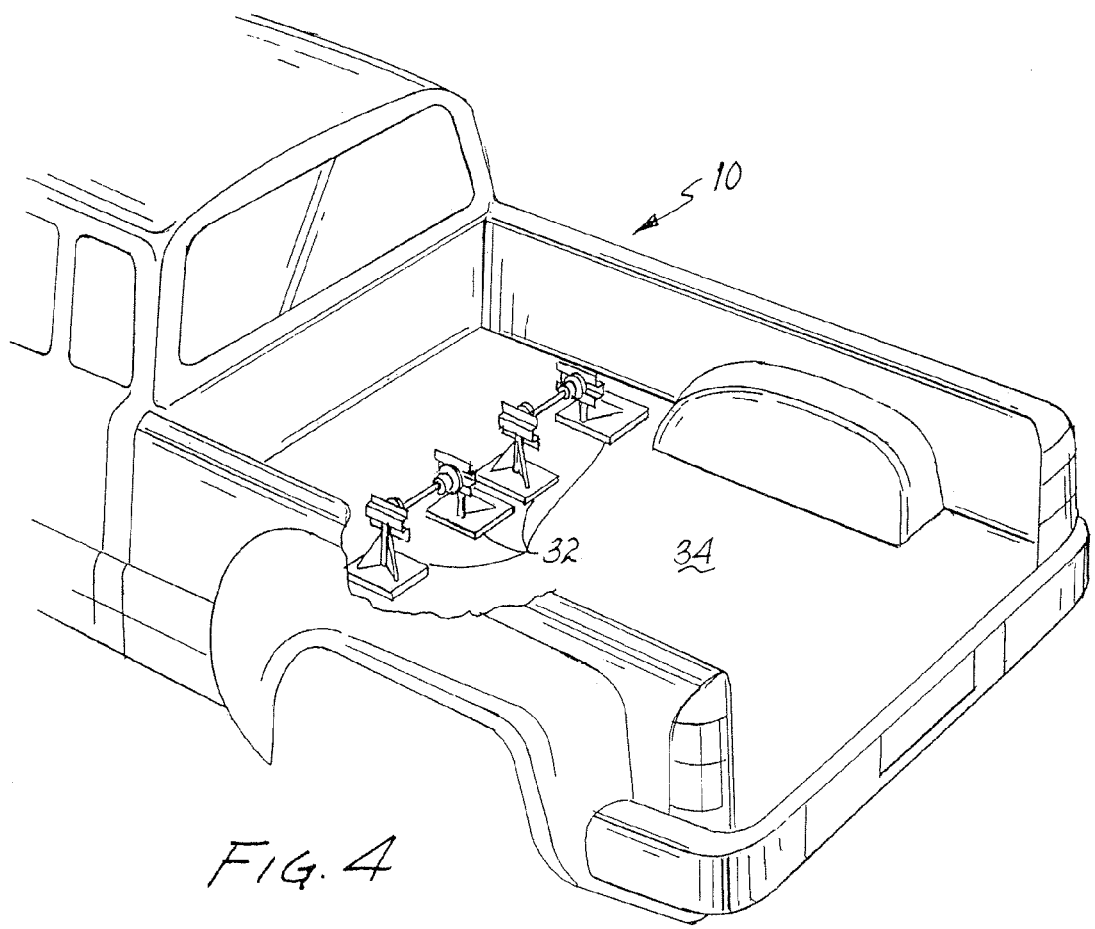
FIG. 4 is an illustration depicting a perspective view of two motorcycle transport devices mounted in a side-by-side arrangement in a truck bed in accordance with an embodiment of the present invention.

Because preferably device 10 is used to transport motorcycle 12 in an upright position with both wheels contacting surface 34 so that most of the weight of motorcycle 12 supported via the suspension of motorcycle 12, transport may be accomplished using minimal space. FIG. 4 depicts an example of how the present invention may be configured to transport two motorcycles in a side-by-side arrangement in the bed of a pickup truck.

Although it is preferred that one or two stands 32 secure motorcycle 12 during transport, it is within the spirit and scope of the present invention that no stands 32 secure motorcycle 12. For example, it may be undesirable to mount stands 32 or base supporting members 40 to surface 34, such as when a truck or van has been rented for moving motorcycle 12. FIG. 8 depicts a use of device 10 in accordance with an embodiment of the present invention where stands 32 are not used. Instead, cables 50 fastened to device 10 are extended to support motorcycle 12. Of course, cables 50 need not be specifically used, and may be replaced by tiedowns, chains, rope, or the like.

While the invention has been particularly shown and described with reference to the preferred embodiments thereof, it will be understood by those skilled in the art that the foregoing and other changes in form, and details may be made therein without departing from the spirit and scope of the invention. For example, crossbar 14 need not have a substantially circular cross-section, and may instead have a cross-section that is square, triangular, or the like. As another example, a single base receiving member 40 may securely couple two or more stands 32.

What is claimed is:

1. A device for securing a motorcycle, comprising in combination:
    a motorcycle defining a substantially horizontal bore extending between a first side of said motorcycle and a second side of said motorcycle;
    a crossbar having a first end and a second end, said crossbar having a length greater than a length of said substantially horizontal bore and being dimensioned to be inserted through said bore;
    a first cap removably coupled to said first end of said crossbar, said first cap having a diameter greater than a diameter of said bore;
    a second cap coupled to said second end of said crossbar, said second cap having a diameter greater than the diameter of said bore;

at least one crossbar attachment mechanism dimensioned to be coupled to at least one of said first cap and said second cap in order to secure transport of said motorcycle while said crossbar is inserted therethrough; and a first collar movably coupled to said crossbar so that said first collar is positionable against one of said first side and said second side of said motorcycle, whereby a positioning of said first collar against the one of said first side and said second side of said motorcycle constrains a movement of said motorcycle relative to said crossbar.

2. The device of claim 1, further comprising a second collar movably coupled to said crossbar so that said second collar is positionable against the other of said first side and said second side of said motorcycle, whereby a positioning of said first collar against said first side of said motorcycle and a positioning of said second collar against said second side of said motorcycle constrains a movement of said motorcycle relative to said crossbar.

3. The device of claim 1, further comprising a protective washer dimensioned to be placed between said first collar and said motorcycle for preventing direct contact between said first collar and said motorcycle.

4. The device of claim 1, wherein said crossbar attachment mechanism comprises a surface of at least one of said first cap and said second cap defining at least one aperture.

5. The device of claim 1, further comprising at least one stand having a vertical support element coupled to a stand attachment mechanism, wherein said stand attachment mechanism is securable to said crossbar attachment mechanism for restricting a motion of said crossbar and said connected motorcycle relative to said stand.

6. The device of claim 5, wherein a vertical position of said stand attachment mechanism is adjustable.

7. The device of claim 5, wherein said stand further having a base rigidly coupled to said vertical support element, and further comprising at least one base receiving member dimensioned to rigidly engage at least a portion of said base when said base is coupled thereto.

8. The device of claim 7 wherein said base receiving member comprising:
a lower portion for mounting said base receiving member to a surface supporting said motorcycle;
an upper portion for restricting an upward motion of said base of said stand when said base of said stand is coupled to said base receiving member; and
a wall vertically separating said lower portion from said upper portion for restricting a lateral motion of said base of said stand when said base of said stand is coupled to said base receiving member, wherein said wall defining an opening dimensioned so that said base of said stand is insertable therethrough, and wherein said upper portion defining a channel dimensioned to allow a passage of said vertical support element of said stand when said stand is coupled to said base receiving member, whereby said stand is attachable to said base receiving member by insertion therein.

9. The device of claim 8, wherein said crossbar attachment mechanism being located proximate both of said first cap and said second cap, and further comprising:
two said base receiving members mounted to said surface supporting said motorcycle; and
two said stands, wherein said base receiving members are positioned so that one of said crossbar attachment mechanisms is attachable to one of said stand attachment mechanisms and the other of said crossbar attachment mechanisms is attachable to the other of said stand attachment mechanisms when said stands are coupled to said base receiving members, whereby said crossbar and said connected motorcycle are securable therebetween.

10. A device for securing a motorcycle, comprising in combination:
a motorcycle defining a substantially horizontal hollow bore extending between a first side of said motorcycle and a second side of said motorcycle; and
a crossbar having a removable first end, a central portion, and a second end, said crossbar having a length greater than a length of said substantially horizontal bore, said crossbar being dimensioned so that only said central portion is insertable through said bore, wherein at least one of said first end and said second end of said crossbar defining at least one aperture in order to secure transport of said motorcycle while said crossbar being inserted therethrough.

11. The device of claim 10, further comprising at least one stand for providing rigid support to said crossbar when said crossbar is secured thereto.

12. The device of claim 11, wherein said stand having at least one portion defining at least one aperture therethrough, whereby said stand is securable to said crossbar via a padlock extending through at least one said aperture of said crossbar and at least one said aperture of said stand.

13. The device of claim 11, wherein said at least one stand having a base rigidly connected to a vertical support element, and further comprising at least one base receiving member dimensioned to rigidly engage at least a portion of said base when said base is coupled thereto.

14. The device of claim 13, further comprising:
two said base receiving members mounted to a surface supporting said motorcycle; and
two said stands, wherein said base receiving members are positioned so that the at least one said aperture defined by said first end of said crossbar is positionable proximate at least one said aperture defined by one said stand and the at least one said aperture defined by said second end of said crossbar is positionable proximate at least one said aperture defined by the other said stand when one said stand is coupled to one said base receiving member and the other said stand is coupled to the other said base receiving member, whereby said crossbar and said connected motorcycle are securable therebetween.

15. The device of claim 10, wherein said crossbar further having at least one threaded cylindrical portion, and further comprising at least one cylindrical collar defining a inner cylindrical bore extending therethrough, said collar having a diameter larger than a diameter of said bore of said motorcycle, wherein at least a portion of said inner bore surface being threaded to engage at least one said threaded cylindrical portion of said crossbar so that said collar is positionable along a length of said crossbar by a rotation of said collar, whereby a motion of said crossbar relative to said bore of said motorcycle is constrainable by positioning said collar against said motorcycle when said crossbar is inserted therethrough.

16. A method of motorcycle transport, comprising the steps of:
providing a motorcycle defining a substantially horizontal hollow bore extending between a first side of said motorcycle and a second side of said motorcycle;
providing a transport surface for supporting said motorcycle;
inserting a crossbar through said bore of said motorcycle;

positioning said motorcycle in an upright position on said transport surface so that each wheel of said motorcycle contacts said transport surface;

securing at least one end of said crossbar to said transport surface;

providing two stands;

coupling each said stand to said transport surface so that a distance between said stands being approximately equal to a length of said crossbar;

wherein said positioning is performed by positioning said motorcycle between said stands;

wherein said securing is performed by coupling one said end of said crossbar to one said stand and coupling the other end of said crossbar to the other said stand;

wherein each said stand comprising a base rigidly connected to a vertical support element;

providing two base receiving members, each said base receiving member being dimensioned to rigidly engage at least a portion of one said base of said stand when said base is coupled thereto;

fastening each said base receiving member to said transport surface so that a distance between said stands being approximately equal to a length of said crossbar when each said stand is rigidly engaged thereto; and wherein said step of coupling said two stands to said transport surface is performed by coupling one said stand to one said base receiving member and coupling the other said stand to the other said base receiving member.

17. The method of claim 16, wherein each end of said crossbar defining at least one aperture, wherein each staid stand defining at least one aperture, and wherein said securing is performed by locking at least one said end of said crossbar to one said stand with a padlock extending through at least one said aperture defined by said crossbar and further extending through at least one said aperture defined by said stand.

* * * * *